US006754026B1

(12) United States Patent
Koski

(10) Patent No.: US 6,754,026 B1
(45) Date of Patent: Jun. 22, 2004

(54) TAPE TRANSPORT SERVO SYSTEM AND METHOD FOR A COMPUTER TAPE DRIVE

(75) Inventor: John Alexander Koski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/429,673

(22) Filed: Oct. 28, 1999

(51) Int. Cl.[7] .............................................. G11B 15/46
(52) U.S. Cl. ................................................... 360/73.04
(58) Field of Search .......................... 360/73.04, 73.05, 360/73.06, 73.11, 73.12, 13, 73.01, 73.08; 242/334.3; 318/7, 560, 652

(56) References Cited

U.S. PATENT DOCUMENTS

| | | | | |
|---|---|---|---|---|
| 3,809,335 A | * | 5/1974 | Mantey ................... 242/333.2 |
| 3,851,116 A | | 11/1974 | Cannon | |
| 3,984,868 A | * | 10/1976 | Ragle et al. ............. 242/334.3 |
| 4,065,074 A | * | 12/1977 | Anderson et al. ........ 242/331.3 |
| 4,139,870 A | | 2/1979 | Tachi | |
| 4,377,826 A | * | 3/1983 | Furuta ....................... 360/72.1 |
| 4,448,368 A | * | 5/1984 | Skalko .................... 242/334.3 |
| 4,461,433 A | | 7/1984 | Kani | |
| 4,731,679 A | * | 3/1988 | O'Gwynn et al. .......... 242/334 |
| 4,743,811 A | * | 5/1988 | Katayama ................. 242/334.4 |
| 4,809,096 A | | 2/1989 | Azuma et al. | |
| 4,811,131 A | * | 3/1989 | Sander et al. .............. 360/74.4 |
| 5,298,841 A | * | 3/1994 | Katayama et al. .......... 318/254 |
| 5,371,449 A | * | 12/1994 | Tajima et al. ............... 318/560 |
| 5,383,069 A | * | 1/1995 | Morita et al. ............. 360/73.11 |
| 5,467,233 A | * | 11/1995 | Yoshino ...................... 360/70 |
| 5,663,845 A | * | 9/1997 | Yamamoto et al. ....... 360/73.11 |
| 5,696,642 A | | 12/1997 | Sawamura et al. | |
| 5,712,539 A | * | 1/1998 | Zweighaft et al. .......... 318/254 |
| 5,717,537 A | | 2/1998 | Watanabe et al. | |
| 5,731,672 A | * | 3/1998 | Miyaguchi .................. 318/293 |
| 6,188,539 B1 | * | 2/2001 | Elliot et al. .............. 360/77.08 |

FOREIGN PATENT DOCUMENTS

| | | |
|---|---|---|
| JP | 02-193350 A | 7/1990 |
| JP | 06-038583 A | 2/1994 |

* cited by examiner

Primary Examiner—David Hudspeth
Assistant Examiner—K. Wong
(74) Attorney, Agent, or Firm—Paik Saber; Bracewell & Patterson, L.L.P.

(57) ABSTRACT

A tape transport servo system and method that do not make use of tachometers and/or encoders to derive tape velocity and position are provided. The tape transport servo system and method derive velocity and position of the tape from a primary and direct manner and also a secondary or alternative manner, especially when the primary or direct manner cannot be used. The tape transport servo system and method control a tape drive and moves a tape between one reel driven by one motor to another reel driven by another motor. The tape is read by a recording head composed of data readers, data writers and a dedicated set of servo read elements. A position and a velocity of the tape are determined from a primary velocity source when the tape is being read by the head. The position and the velocity of the tape are determined from a secondary velocity source when the tape is not being read by the head. The velocity of the tape is compared to a desired programmed reference velocity for the tape. The velocity of the tape is driven to the desired programmed reference velocity if the velocity is not equal to the desired velocity. The velocity of the tape is controlled by regulating the velocity and the driving currents of the motors. The tape transport servo system comprises a digital signal processor and a servo motor control system. The servo motor control system comprises a servo logic system, sensors, PWM motor drivers, power amplifiers, DACs, counters, computation systems, and a timing-based servo pattern monitoring system.

24 Claims, 6 Drawing Sheets

DSP = Digital Signal Processor or Microprocessor
Servo Logic = Counters, timers, etc.
PWM = Pulse Width Modulation
Hall Sns = Hall sensors
TB Servo Pattern = Timing-Based Servo Pattern (read from servo track on the tape)

TAPE TRANSPORT SERVO SYSTEM AND METHOD FOR A COMPUTER TAPE DRIVE

BACKGROUND OF THE INVENTION

1. Technical Field

The present invention relates in general to a tape transport servo system and method for a computer drive and in particular to a tape transport servo system and method that eliminates the use of tape deck encoders and/or tape-path tachometers for controlling tape velocity and position. The present invention relates to a tape transport servo system and method that derives tape velocity from a primary velocity signal, such as from a servo track pre-recorded on the tape, and that also derives tape velocity from a secondary velocity signal, such as from pulse-width-modulation (PWM) signals driving two reel motors.

2. Description of the Related Art

Tape drives for computer systems have been in existence in the computer field. One type of tape drive, such as the Sapphire media tape drive, involves two reels of tape wherein one of the two reels is a supply reel and the other of the two reels is a take-up reel. The tape on the reels is typically a half inch (0.5") wide. The reels are housed in a tape drive cartridge, and this type of tape drive typically has a 5.25" form factor wherein the form factor (i.e. physical size of the tape drive or cartridge) is 6" across, 3" high, and 12" deep. The supply reel is driven by a supply reel motor while the take-up reel is driven by a take-up reel motor. Control algorithms are used to control the speed of these two motors.

For these types of tape drives or tape transports, the position and velocity of the tape need to be controlled. The control algorithms require the determination of the position and velocity of the tape in order to properly control the speed of the reel motors. Tachometers and encoders are presently used to calculate the position and velocity of the tape. The tachometer and encoder are mounted near the motor, and they put out pulses to a monitoring logic card having a set of counters. The monitoring card has a processor and memory. The processor is a digital signal processor (DSP) inside the tape drive. The processor computes velocity and position, and the processor computes how much tape is on each reel. The processor uses all of the information to compute the electrical current driving the motor. The two tape reels, tape, and two motors that drive the reels are considered a plant. The plant receives multiple inputs and sends multiple outputs. For example, inputs to the plant are continuous currents to the motor for controlling the motor. The outputs from the plant are velocity, tape tension, and position. Tachometers have been used to count a wheel that rotates with a respective motor or a wheel that is driven by the tape. A tachometer is an optical device, which generates a pulse waveform having 512 pulses per turn of the motor. If faster pulses are generated, then the faster the motor is turning. An encoder puts out a pulse train having a frequency proportional to the frequency of the motor.

In some present IBM tape drives or products, two tachometers are used, that is, a tachometer is mounted and coupled to each of the two motors. Alternatively, a tachometer is mounted on a wheel that is in the tape path. The tachometer puts out a pulse form in proportion to the speed of the tape or motor, such as one pulse per revolution of the motor. Index pulses are needed from each reel. A determination of the radius of the tape on each reel is required to determine speed of the motor and velocity of the reel. The radius of the tape on a reel is determined from the tachometer and the pulse per turn for each reel and by using the encoder. However, since the tape drive is a 5.25" form factor, physical and mechanical space becomes an issue. Digital tachometers and encoders take up space within the tape cartridge. Therefore, it is advantageous and desirable to eliminate the use of tachometers and encoders in these tape drives due to physical and mechanical space concerns.

Linear tape open (LTO) is a standard that presently exists for tapes and tape drives. The LTO standard for tape and tape drives is incorporated by reference herein. FIG. 1 illustrates a conventional format for a LTO tape 48, and FIG. 2 illustrates the manner of how a read/write head 46 reads the servo tracks 49 and writes data to the LTO tape 48. In FIG. 1, the LTO tape generally comprises five (5) servo tracks 49 that make up four (4) servo bands 47. Each servo track comprises a number of bursts 96 or pulses. The timing measurement of these bursts 96, which may be for example in a 5-5-4-4 pattern, are used to generate a primary velocity signal. Referring to FIG. 2, a data band 45 exists between each two (2) adjacent servo tracks 49, and each data band comprises eight data tracks 94 where data is written thereto. A read/write head 46 spans two servo tracks 49 and one data band 45 at any one time. The two servo read heads 90 of the read/write head 46 each respectively read one of the two servo tracks 49 while the write head 92 of the read/write head 46 writes to the data tracks 49 of the data band 45. The read/write head 46 moves from one servo band 47 to another servo band 47 when reading/writing to tape 48.

Thus, times exist when the head(s) 46 does/do not read the signals from the servo tracks 49 of the LTO tape 48, such as starting and stopping of the tape 48 and reels 41 and 43 or when the tape 48 and reels 41 and 43 are below some minimum speed or above some maximum speed or when the servo head(s) 46 is/are indexing laterally between the servo tracks, or servo bands which are spaced laterally across the tape width. Therefore, a secondary or alternative manner for deriving velocity and position of the tape 48 is also needed and desired, especially when the primary and direct manner of deriving the tape velocity and position cannot be used.

It is therefore advantageous and desirable to provide a tape transport servo system and method that do not make use of tachometers and/or encoders to derive tape velocity and position. It is also advantageous and desirable to provide a tape transport servo system and method that are able to derive velocity and position of the tape from a primary or direct manner and also from a secondary or alternative manner, especially when the primary and direct manner cannot be used.

SUMMARY OF THE INVENTION

It is therefore one object of the present invention to provide a tape transport servo system and method that do not make use of tachometers and/or encoders to derive tape velocity and position.

It is another object of the present invention is to provide a tape transport servo system and method that are able to derive velocity and position of the tape from a primary and direct manner and also a secondary or alternative manner, especially when the primary or direct manner cannot be used.

It is another object of the present invention to provide a tape transport servo system and method that rely on deriving the velocity from both a primary velocity source and signal and a secondary velocity source and signal.

The foregoing objects are achieved as is now described. A tape transport servo system and method that do not make use of tachometers and/or encoders to derive tape velocity and position are provided. The tape transport servo system and method derive velocity and position of the tape from a primary and direct manner and also a secondary or alternative manner, especially when the primary or direct manner cannot be used. The tape transport servo system and method controls a tape drive and moves a tape between one reel driven by one motor to another reel driven by another motor. The tape is read by a recording head composed of data readers, data writers and a dedicated set of servo read elements. A position and a velocity of the tape are determined from a primary velocity source when a servo track recorded on the tape is being read by the head. The position and the velocity of a servo track recorded on the tape are determined from a secondary velocity source when the tape is not being read by the head. The velocity of the tape is compared to a desired programmed reference velocity for the tape. The velocity of the tape is driven to the desired programmed reference velocity if the velocity is not equal to the desired velocity. The velocity of the tape is controlled by regulating the velocity and the driving currents of the motors. The tape transport servo system comprises a digital signal processor and a servo motor control system. The servo motor control system comprises a servo logic system, sensors, PWM motor drivers, power amplifiers, DACs, counters, computation systems, and a timing-based servo pattern monitoring system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention provides a tape transport servo system 10 and method that do not make use of tachometers and/or encoders to derive tape velocity and position. The present invention tape transport servo system 10 and method derive velocity and position of the tape 48 from a primary and direct manner and also a secondary or alternative manner, especially when transient conditions exist which prevent the primary or direct manner from being used. The present invention tape transport servo system 10 and method rely on deriving the velocity from both a primary velocity source and signal and a secondary velocity source and signal.

Figure 3:
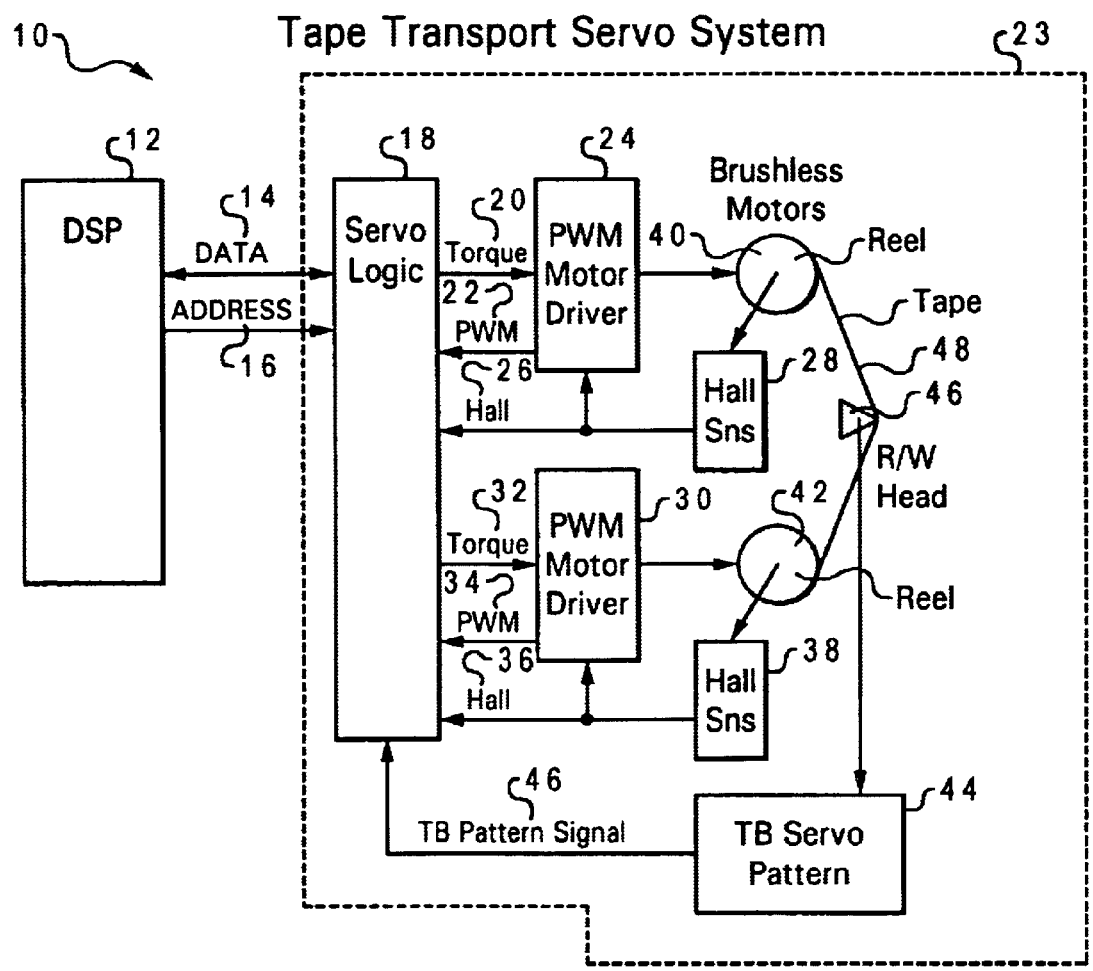
FIG. 3 is a block diagram of the overall present invention tape transport servo system.

With reference now to the figures and in particular with reference to FIG. 3, the overall present invention tape transport system 10 is shown. The system 10 has a digital signal processor or microprocessor (DSP) 12. DSP communicates data 14 between and directs addresses 16 to a servo motor control system 23. The DSP 12 communicates directly with the servo logic system 18 of the servo motor control system 23. The servo logic system 18 includes counters, timers, sensor circuits, register data, etc, and the servo logic system 18 is in communication with other components and sub-systems of the motor control system 23.

Figure 6:
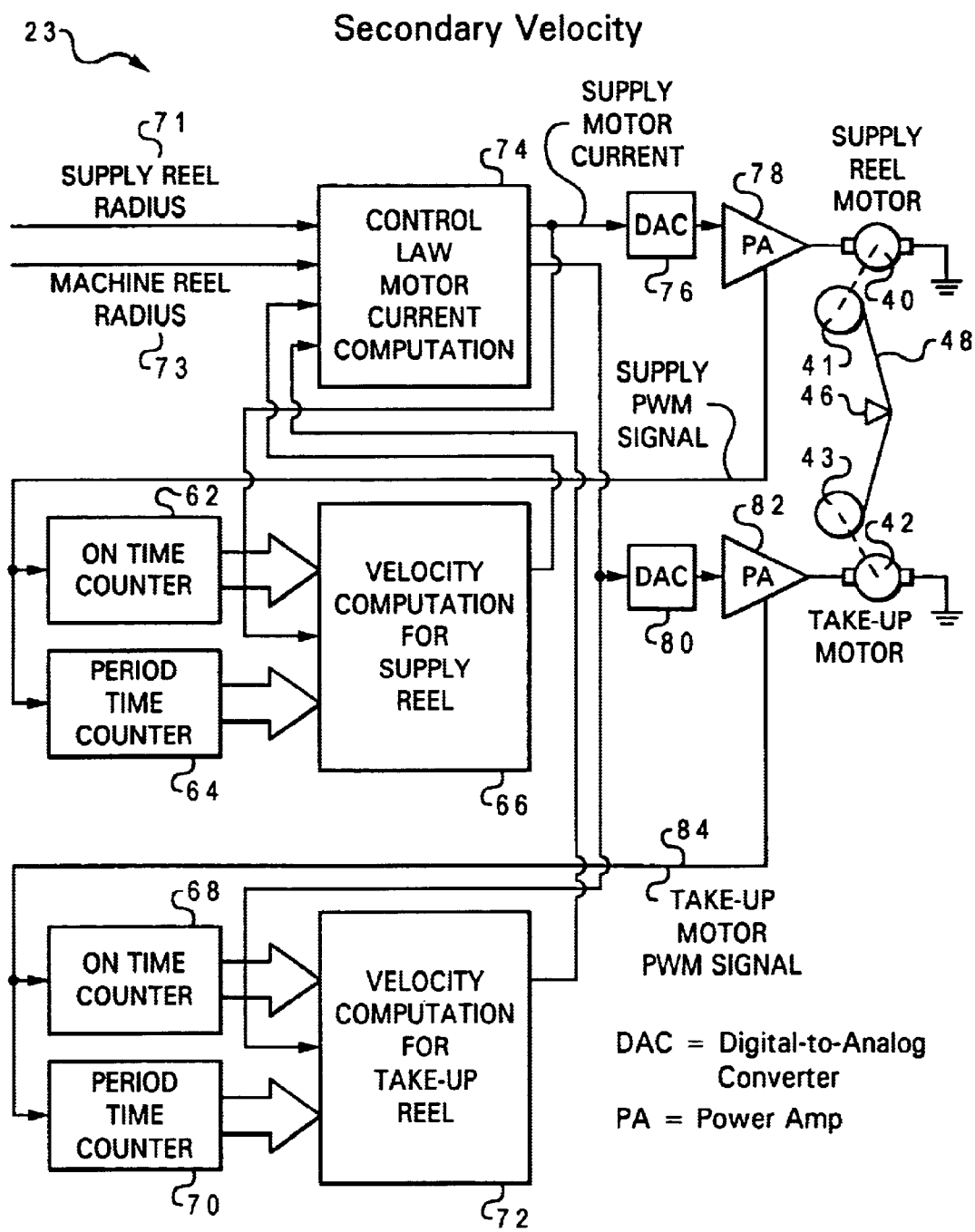
FIG. 6 is a more detailed block diagram of the motor controller system of the present invention tape transport servo system wherein the motor controller system determines and uses secondary velocity for controlling tape velocity and position.

FIGS. 3 and 6 show that tape 48 is driven from supply reel 41 to take-up reel 43. The supply reel 41 is driven by supply reel motor 40 while the take-up reel 43 is driven by take-up reel motor 42. A read/write head 46 is located in the tape path between the reels and reads the tape 48. A hall sensor 28 senses the motor armature position from the motor 40, and the hall sensor 38 senses the motor armature position from the motor 42. PWM motor driver 24 receives the sensed hall signal from the hall sensor 28 while the PWM motor driver 30 receives the sensed hall signal from the hall sensor 38. The sensed hall signals from the hall sensors 28 and 38 are also sent to the servo logic system 18. The PWM motor drivers 24 and 30 respectively drive the motors 40 and 42. The PWM motor drivers 24 and 30 communicate and send PWM signals 34 to the servo logic system 18 while drivers 24 and 30 receive torque data 32 from the servo logic system 18. The pulse width modulation (PWM) motor driver 24 is coupled to a reel motor 40 while another pulse width modulation (PWM) motor driver 30 is coupled to a reel motor 42. A timing-based (TB) servo pattern detection system 44 receives the servo pattern signal from the servo track 49 of tape 48 via a servo read head in the read/write head 46. The TB servo pattern detection system 44 sends TB pattern signals 46 to the servo logic system 18.

Figure 4:
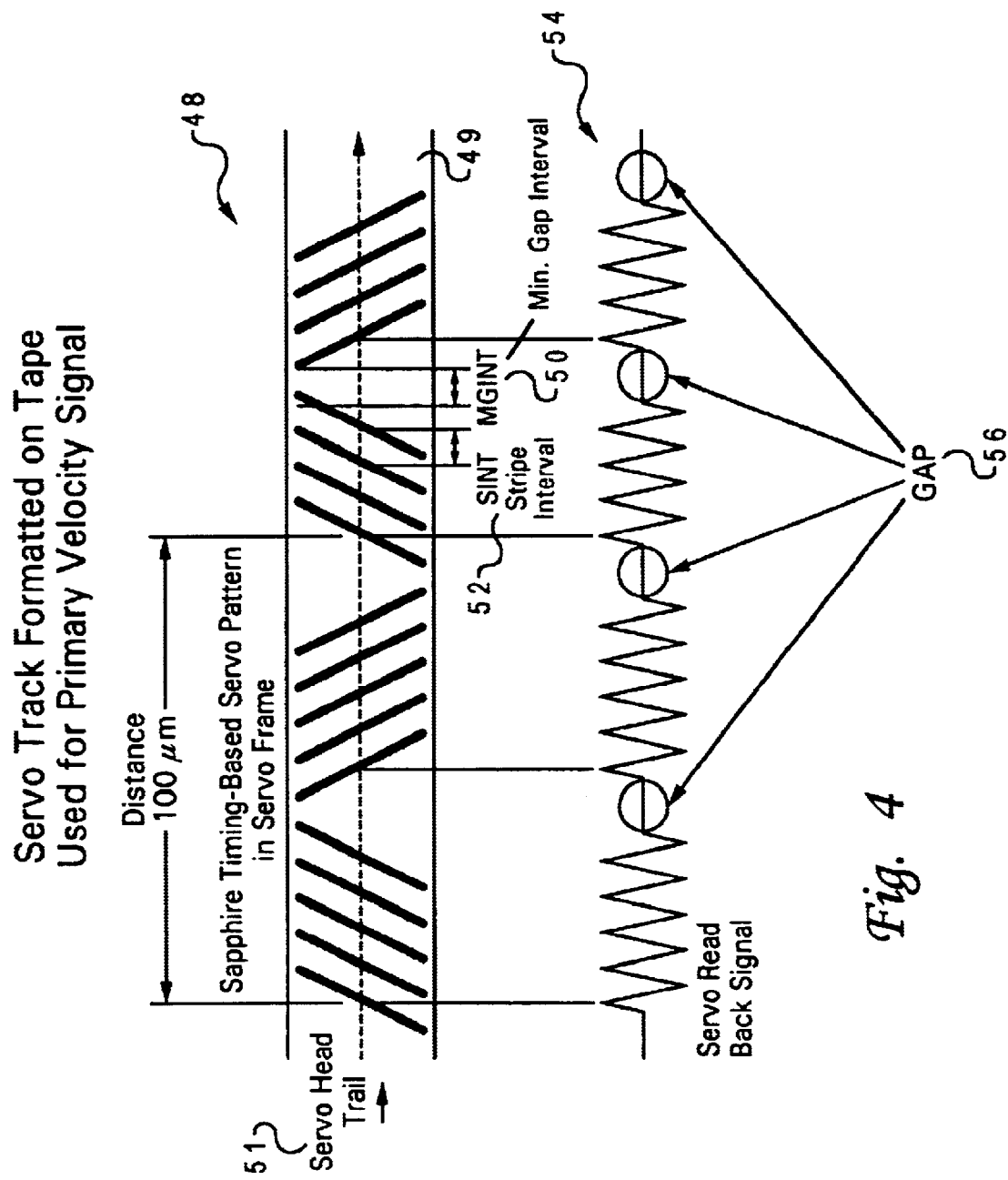
FIG. 4 is a side and detailed view of a servo track of a tape formatted for having a primary velocity signal and the corresponding servo read back signal for the servo track.
Figure 5:
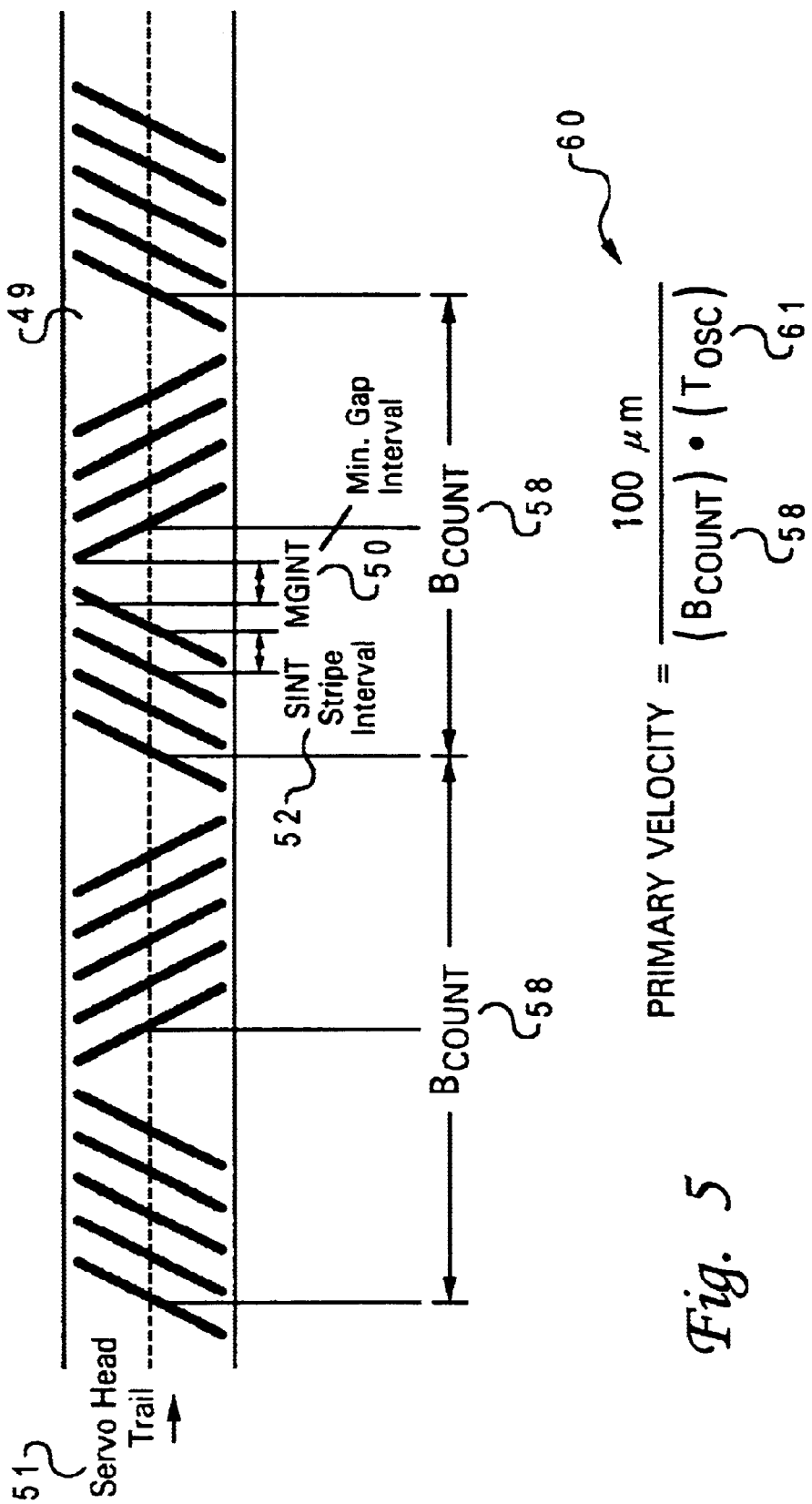
FIG. 5 is a side and detailed view of the servo track as shown in FIG. 4 showing the Bcount and the formula that uses the Bcount to calculate primary velocity.

With reference now to the figures and in particular with reference to FIGS. 4 and 5, the primary or direct way of determining position and velocity of the tape 48 on the reels 41 and 43 (see FIG. 6) involves using the pre-recorded servo track 49 on the tape 48. The tape 48 (or Linear-Tape Open media) is pre-formatted with a longitudinally written servo track 49 for track-following. The servo track 49 is written longitudinally along the entire length of tape 48 and is replicated transversely five times to create four servo regions or bands across the width of tape wherein each servo band is composed of two adjacent servo tracks. Since the width of the data track is so narrow, the servo track 49 is necessary to properly align the lateral position of the tape 48 over the head(s) 46. Current IBM and competitor tape drive products have servo tracks 49. A portion of the half inch width tape 48 is allocated to the servo track 49. Referring to FIG. 4, a series of pulses 54 (separated in between by gaps 56) are recorded on the tape 48. The series of pulses 54 recorded on the tape 48 are much like the encoder that puts out a pulse train having a frequency proportional to the speed of the motor 40 or 42. Thus, the longitudinal tape velocity and the transverse head-to-tape position information is derived from the servo track 49. The servo track 49 is a linear tape open (LTO) track. The servo track 49 needs to be available in order to provide proper track following as well as velocity information.

Figure 1:
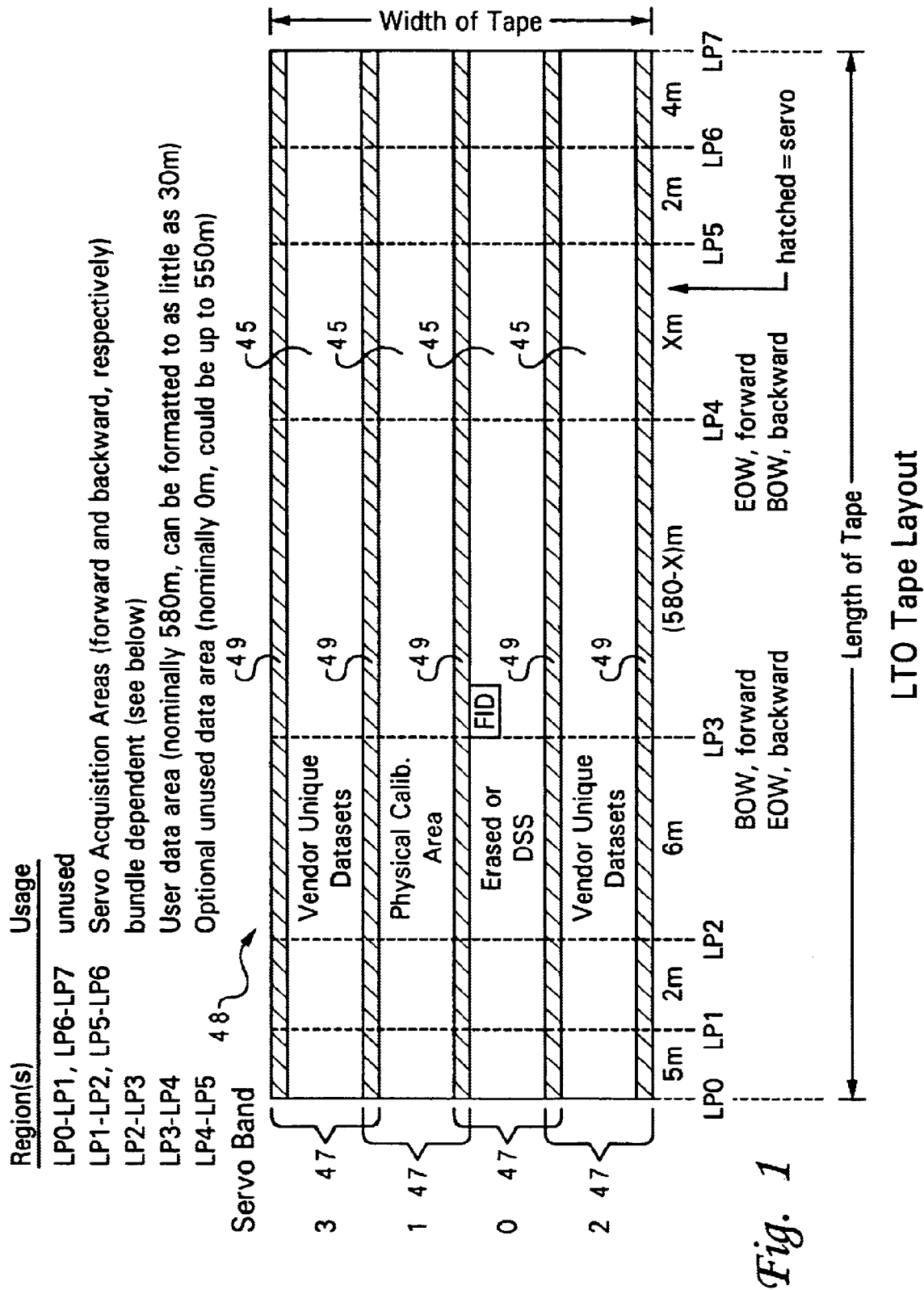
FIG. 1 is a prior art diagram showing the layout of a Linear Tape Open (LTO) tape.
Figure 2:
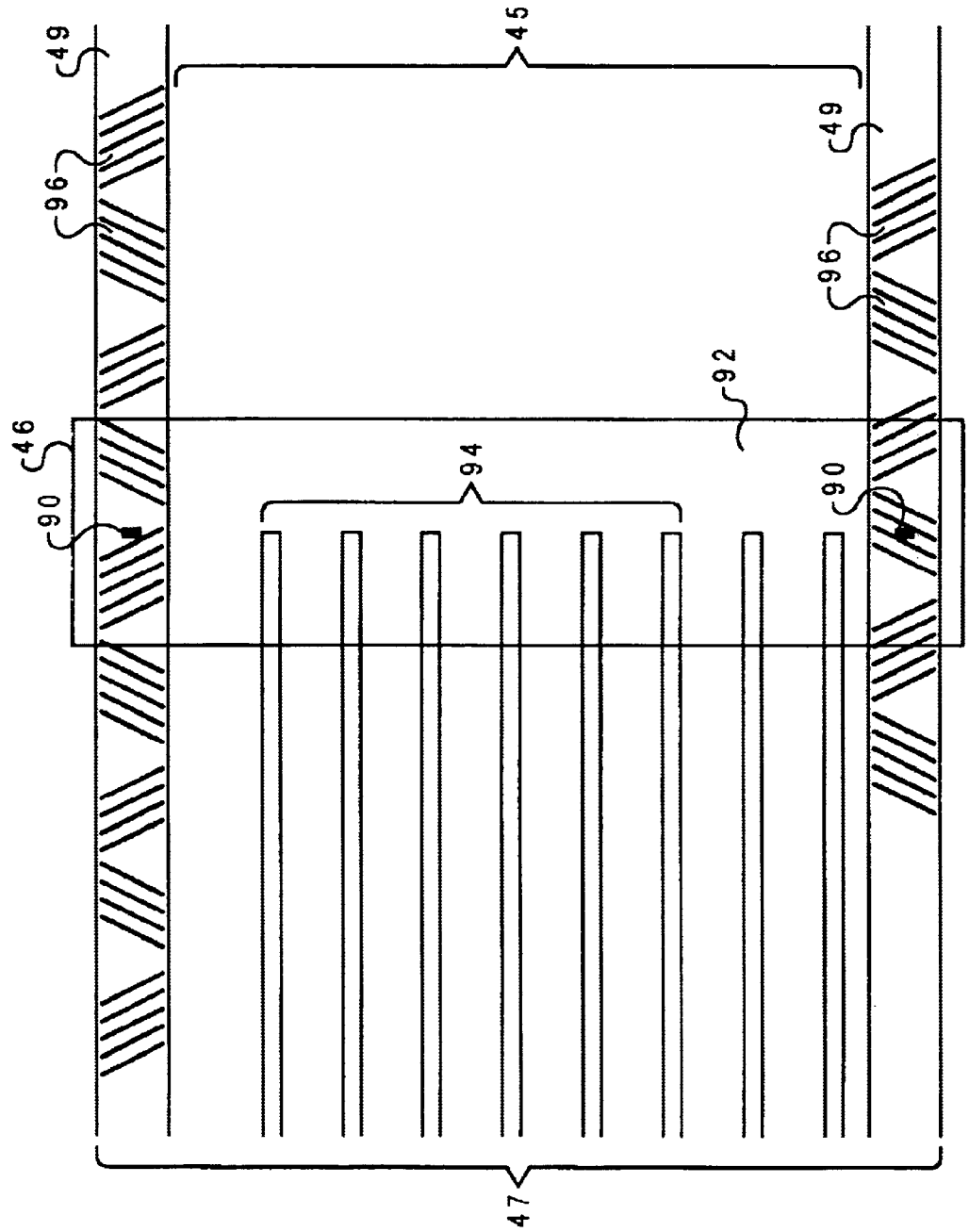
FIG. 2 is a prior art diagram showing a read/write head reading two adjacent servo tracks and writing and recording data in the data band between the two servo tracks of a LTO tape.

With reference to FIGS. 4 and 5, the servo tracks 49 on the tape 48 are used to control velocity of the reels. However, the information is only available when servo reader head(s) 46 is/are positioned over the servo tracks 49. Times exist when the head(s) 46 does/do not read the signals from the servo tracks 49, such as starting and stopping of the tape 48 and reels 41 and 43 or when the tape 48 and reels 41 and 43 are below some minimum speed or above some maximum speed or when the servo head(s) 46 is/are indexing laterally between the servo tracks 49, or servo bands 47 which are spaced laterally across the tape width (see also FIGS. 1 and 2). For example, the head(s) 46 move(s) width wise while the tape 48 moves lengthwise. When the head(s) 46 move(s) between servo bands 47, a time exists in which the primary velocity is not able to be derived from the servo track 49 to control the tape velocity, and the velocity must be obtained in some other or alternative manner. The velocity signal derived directly from the servo track 49 of the tape 48 is very accurate and is considered to be the primary velocity signal. With reference to FIGS. 1 and 5, the servo tape 48 generally has five servo tracks 49 wherein these tracks 49 are equally spaced apart and wherein adjacent pairs of servo tracks 49 form a servo band 47. The head 46 has two servo readers 90 that are simultaneously reading two of the five servo tracks 49. All of the data that is stored on the tape is written in data tracks 94 parallel to the servo tracks and positioned between two adjacent servo tracks 49 in a data band 45. For this purpose, the head 46 has multiple data writers and reader elements positioned between the servo reader elements.

The LTO media or tape 48 is pre-formatted with longitudinally written servo tracks 49 for track-following. Each servo format track 49 is a sequence of flux transitions recorded in bursts separated by media without flux transitions. With reference to FIGS. 4 and 5, the bursts are a repeated pattern of 4, 4, 5, and 5 transitions. The separation between transitions within each burst is 5 um. The spacing between the beginning of the two 4-transition bursts to the beginning of the two 5-transition bursts, and likewise between the beginning of the two 5-transition bursts to the beginning of the two 4-transition bursts is 100 um. The spacing between 4-to-4 and 5-to-5 bursts varies with transverse position across the servo track. The spacing between 4-to-5 and 5-to-4 transitions is measured with a time period counter which produces a value referred to as the B-count in the servo system 10. This count varies only with the longitudinal tape velocity at the head 46, and in the formulation, it provides data to calculate the control signal for accurate velocity control during data transfer operation. Referring to FIG. 5, the servo digital signal processor (DSP) 12 computes the tape velocity from the B-count 58 by the following relationship:

$V_t$=(100 um)/(Bcount *Tosc), where $V_t$=Tape velocity

Bcount=Value of the B-counter

Tosc=Period of the clock for the B-counter.

In other words, the B-count 58 is only available for velocity control while the servo read head 46 is positioned over the servo track 49, and tape velocity is within the dynamic range of the recording channel and B-counter logic. The velocity information derived from the servo track 49 is unavailable during a large part of the acceleration and deceleration profile, or when the servo reader head 46 is not positioned over the servo track 49, as during indexing between servo bands which are adjacent sets of servo tracks 49, or during cassette initialization. Very long drop-outs in the servo signal also make the total B-count value 58 unavailable for tape velocity control. Thus, an alternative or secondary method and system are needed to provide the tape velocity when the primary or direct manner is not able to provide it.

With reference now to the figures and in particular with reference to FIG. 6 and FIG. 3, the servo motor control system 23 that is able to obtain tape velocity from a secondary or alternative manner is shown in detail. Referring to FIG. 6, the motor control system 23 provides information to a control and computation system 74 which resides DSP 12. The system 74 obtains and receives input information from the supply reel 41 and the machine or take-up reel 43, that is, it obtains and receives the supply reel radius 71 and the machine/take-up reel radius 73. The manner in which these reel radii are obtained will be discussed later in more detail. The system 74 computes the desired motor current values by which the respective motors should be driven to control and maintain the motors at certain velocities. The system 74 is programmed for this purpose with control law algorithms and formulas. These algorithm(s) and formula(s) are executed by the DSP 12 to control the motors 40 and 42, and they will be discussed later in more detail.

In FIG. 6, the system 74 provides and drives the supply reel motor current value to a digital-to-analog converter (DAC) 76. The current value is converted to an analog value and inputted into a power amplifier (PA) 78. The current value is used by PA 78 to drive the supply reel motor 40 which is excited in a pulse width modulated manner to vary the applied motor voltage as a function of the difference between the desired motor current from DAC 76 and the actual motor current as sensed in power amplifier 78. A supply reel motor pulse width modulation (PWM) signal is generated by the pulse-width modulator and is fed back from motor 40 via the PA 78. The signal is fed to an on-time counter 62 and a period time counter 64. A velocity computation system 66 receives the counts and values from the on-time counter 62 and the period time counter 64, and in addition, it receives the current value for exciting supply reel motor 40. The system 66 then calculates the actual/sensed angular velocity for the supply reel motor 40. The actual/sensed angular velocity is fed and inputted into the system 74. The system 74 computes linear tape velocity from motor angular velocity and sums the actual/sensed velocity with the desired/programmed velocity to compute a velocity error signal. The velocity error signal is used to compute the excitation current for motor 40 to drive the velocity error signal to zero. The calculated current is sent to DAC 76 and is amplified by PA 78 to drive the pulse-width modulator at PA 78, and the modulator produces binary output signals to control the power switches of PA 78, and, as a result, the excitation current of the motor 40.

In FIG. 6, the system 74 also provides and drives the take-up reel motor current value to a digital-to-analog converter (DAC) 80. The current value is converted to an analog value and inputted into a power amplifier (PA) 82. The current value is used by PA 82 to drive the take-up reel motor 42 which is excited in a pulse width modulated manner to vary the applied motor voltage as a function of the difference between the desired motor current from DAC 80 and the actual motor current as sensed in power amplifier 82. A take-up reel motor pulse width modulation (PWM) signal is generated by the pulse-width modulator and is fed back from motor 42 via the PA 82. The signal is fed to an on-time counter 68 and a period time counter 70. A velocity computation system 72 receives the counts and values from the on-time counter 68 and the period time counter 70, and in addition, it receives the current value for exciting take-up reel motor 42. The system 72 then calculates the actual/sensed angular velocity for the supply reel motor 42. The actual/sensed angular velocity is fed and inputted into the system 74. The system 74 computes linear tape velocity from motor angular velocity and sums the actual/sensed velocity with the desired/programmed velocity to compute a velocity error signal. The velocity error signal is used to compute the excitation current for motor 42 to drive the velocity error signal to zero. The calculated current is sent to DAC 80 and is amplified by PA 82 to drive the pulse-width modulator, and the modulator produces binary output signals to control the power switches of PA 82, and as a result, the excitation current of the motor 42.

In the method for computing linear tape velocity from the motor angular velocity, the angular velocity from velocity computation 66 of the supply reel motor 40 is multiplied by the supply reel radius 71, yielding the linear tape velocity at the supply reel. Likewise, the angular velocity from velocity computation 72 of the take-up reel motor 42 is multiplied by the take-up reel radius 73, yielding the linear tape velocity at the take-up reel. These two velocity signals are processed by a digital compensation filter in control law 74. The value of the linear tape velocity is the average value of the linear velocity at the supply reel and the linear velocity at the take-up reel. Alternatively, the linear tape velocity can be set equal to the linear velocity at either the supply reel or the take-up reel.

The motor excitation voltage provides the sense signal for the secondary or alternative velocity control mode. This secondary or alternative method that senses the motor excitation voltage makes use of the pulse width modulators (incorporated in the PAs 78 and 82) which control the motor power drivers 24 and 30 (see FIG. 3). The servo logic system 18 provides information to the control law for driving the tape transport system 10 to produce torque output values 20 and 32 for respectively driving the motors 40 and 42. The torque values 20 and 32, which are proportional to motor current, are converted to analog signals by the DACs 78 and 82 (see FIG. 6), and they are summed with the actual/sensed motor current signals for each reel, that is, reels 41 and 43. The summation provides current error signal which are amplified to drive the pulse width modulators (incorporated in the PAs 78 and 82). The modulators produce binary output signals to switch power to the motors 40 and 42 between their positive and negative senses of the power supply voltage if the motors are brushed motors. If brushless motors are instead employed, then the binary outputs of the modulators control the power stage through brushless motor commutator logic and hall sensors.

The duty-cycle of the PWM signal determines the applied motor voltage. During the on-time of the signal, the power supply voltage is applied to the motors 40 or 42 in the positive sense. During the off-time of the PWM signal, the power supply voltage is applied to the motor 40 or 42 in the negative sense. The motor voltage is monitored by the DSP 12 by reading counters that measure the on-time and off-time of the PWM signal. Referring to FIG. 6, these counters are on-time counters 62 and 68 and period time counters 64 and 70. The motor voltage and the motor velocity are computed by the DSP 12 using the following equations:

$$Vm = Vsupply * ((Ton-Toff)/(Ton+Toff))$$

$$w = (Vm - Im*Ra)/Kb$$

$$Vt = w*R$$

wherein,
Ton=PWM on-time
Toff=PWM off-time
Vt=Tape velocity
Vm=Motor excitation voltage
w=Motor angular velocity
Vsupply=Power supply voltage
Im=Motor current
Ra=Motor resistance
Kb=Motor back-emf constant
R=Radius of the reel.

The secondary velocity is computed for both reels 41 and 43. The computation requires knowledge of motor current and reel radius. The reel radius is derived from tape transport sensors. The motor current is computed from servo control law within system 74 as shown in FIG. 6 and is available for use in calculating the secondary velocity by the secondary/alternative method.

In sensing the radius of both reels 41 and 43, signals which switch one time per revolution for each reel are employed. If brushless motors are used for motors 40 and 42 to respectively drive the reels 41 and 43, then hall sensors 28 and 38 are respectively available and may be used for determining the reel radius for each reel. If brushed motors are used for motors 40 and 42, then low cost slotted optical sensors (i.e. not shown) are used instead of the hall sensors 28 and 38 wherein each optical sensor is used to detect a flag that rotates with reel motion. Such optical sensors may be required to facilitate tape path threading and therefore may also be used for sensing radii of the reels 41 and 43.

One method used or implemented for determining reel radius is disclosed as follows: For each reel (i.e. reel 41 and 43), a counter is provided to count the number of tape servo format bursts or intervals read by the servo read head positioned over the servo track that occur during each reel revolution. Each servo format interval or B-count interval represents 100 um of tape distance or motion. The count on the number of servo track format intervals per each complete reel revolution varies proportionally with the reel radius, and the DSP 12 computes the radius for each reel using the following equation:

$$R = (C_{rad}) * 100 \text{ um}/2*pi$$

wherein,
R=reel radius
$C_{rad}$=Radius counter value.

The radius counters must have a valid servo format read signal available from the servo track 49 in order to develop and calculate usable data for this radius computation. Therefore, the values of the counters must be qualified by the DSP 12 prior to usage in the radius calculation. The radius counter values will be used only when full revolutions of the reels complete while valid tape servo format intervals or B-count intervals are being detected. Thus, the tape transport servo system 10 must be above a certain minimum velocity and remain above that velocity while the radius count is being generated for a full rotation of each reel. The DSP 12 determines when this condition has been met.

The DSP 12 filters radius counter values with previous values. During cassette initialization, the value of the reel radii must be sensed prior to full dynamic operation of the system 10. The DSP 12 establishes tape velocity based on the secondary velocity signal and acquires the servo format on the tape 48 using a coarse actuator for transverse head position on tape. After the format is acquired, the radius values for each reel are initialized to enable full dynamic motion of the system 10 employing plant dynamics estimation.

Another method used or implemented for determining reel radius is disclosed as follows: This method involves deriving the reel radius by reading a numerical value encoded into the servo format track on the tape 48 called the LPOS. The LPOS value is read when the reel index pulse occurs. The LPOS represents the linear position along the tape 48, and it has a resolution equal to B-count interval. The difference between the LPOS values at two positions along the tape 48 provides a measure of the length of tape 48 between these positions wherein the length is given in the resolution of an one B-count interval (100 um). Thus, the LPOS difference between two successive reel index pulses provides the length of tape wrapped onto the reel for one revolution of the reel which is the circumference of the reel 41 or 43. The reel radius is calculated using the following equation:

$$R = (LPOSn - LPOSn\text{-}1) * 100 \text{ um} / 2 * pi$$

wherein,

R=reel radius

LPOSn=LPOS value at the most recent index pulse

LPOSn-1=LPOS value at the previous pulse.

An estimate of plant dynamics is computed to allow and consider high performance start/stop motion with minimum tension disturbance. The angular inertia of each reel/motor system (i.e. reel/motor 41 and 40 and reel/motor 43 and 42) is estimated from the sensed radius using the following equation:

$$J = (pi * r * w/2) * (R^4 - R0^4) + J0$$

wherein,

J=inertia of the tape, empty reel, clutch and motor r=tape mass density w=tape width R=reel radius R0=radius of the empty reel J0=inertia of the empty reel, clutch and motor.

The control law computes the control current for each motor 40 and 42. The motor control current is computed using the following equations:

$$Im = (J*A)/(R*Kt) + (R*Ft)/Kt + tf/Kt, \text{ and}$$

$$A = (A\text{max}/Verr\text{max}) * Verr$$

wherein,

Im=Motor current

J=inertia of tape, empty reel, clutch and motor

A=acceleration of tape to correct velocity error

Amax=Maximum acceleration rate allowed

R=Reel radius

Kt=Motor torque constant tf=Friction torque estimate

Verr=Velocity error

Verrmax=Maximum applied velocity error

Ft=Desired tension force in the tape.

Application of the estimate of the plant dynamics yields an open-loop gain for the velocity control servo given by the term: Amax/Verrmax (1/seconds). This term provides a first order control system with stable characteristics. A digital filter is able to be applied to the velocity signal to improve signal quality and to achieve desired stability margins. Tension is controlled by the term (R*Ft)/Kt. The friction torque estimate, tf, is computed from the steady state velocity error, which is integrated to zero with this term.

Velocity error is computed from either the primary velocity signal or the secondary velocity signal. The primary velocity and secondary velocity are computed by the DSP 12 to provide equivalent resolutions for the two signal sources. The DSP 12 determines when to switch between secondary and primary velocity signals. The primary velocity signal has a valid flag associated with it that is used for this purpose. Whenever the valid flag is true, and has been true for a predetermined time, the primary velocity signal is selected as sensed velocity. Otherwise, the secondary velocity signal is selected as sensed velocity. The sensed velocity is subtracted from the reference velocity (desired/programmed velocity) to give the velocity error. During acceleration and deceleration, a reference velocity profile is computed to provide closed loop velocity control during acceleration and deceleration modes.

As an example, the system 10 may use brushed motors or brushless motors 40 and 42 to respectively drive the reels 41 and 43 (see FIG. 6). The PWM motor drivers 24 and 30 obtain a signal from the DSP 12 which represents the reference (desired/programmed) torque or current value (see FIG. 3). The control algorithm or law 74 in the DSP 12 receives as data, the radii of the two reels and the computed velocity of the tape, and outputs respective control reference currents to the motors 40 and 42. The DACS 76 and 80 and the PAS 78 and 82, that make up the PWM motor drivers 24 and 30, take control reference currents and convert them to analog signals.

The difference between the actual motor current information and the reference current values generate motor current error signals. The motor current error signals are amplified.

The amplified motor current error signals which are analog signals, are turned into pulse wave forms by a PWM within each of the PAs 78 and 82. The pulse wave forms control the voltages applied to the motors 40 and 42. For example, if the motors 40 and 42 operate on and are driven by a positive and negative 12 volt power source, then the pulse waveform (PWM signal) switches between the +12 V and −12V based on the PWM signals. When the PWM signal is on, the +12V is applied to the motor. When the PWM signal is off, the −12V is applied to the motor. Thus, the timing of the pulse waveform (PWM signal) determines the voltage of the motor being driven, and varies it continuously between +12 volts and −12 volts depending on the PWM signal duty cycles.

The counters 62 and 68 measure the on-time while the counters 64 and 70 measure period time by counting number of cycles of an oscillator or clock (i.e. how many clock cycles). The PWM on-time count and the PWM period time count provide the information to the secondary velocity computation blocks 66 and 72 for computing motor angular velocity from motor voltage and motor current, secondary velocity is computed from the motor angular velocity. The control law uses the computed velocity (either the primary velocity or the secondary velocity) and reference velocity to generate an velocity error signal value, and the control law computes the motor currents to drive this velocity error signal value to zero.

Thus, a tape transport servo system 10 and method that do not make use of tachometers and/or encoders to derive tape velocity and position are provided. Also, a tape transport servo system 10 and method that derive velocity and position of the tape 48 from a primary and direct manner and also a secondary or alternative manner, especially when the primary or direct manner cannot be used, are provided.

While the invention has been particularly shown and described with reference to a preferred embodiment, it will be understood by those skilled in the art that various changes in form and detail may be made therein without departing from the spirit and scope of the invention.

What is claimed is:

1. A tape transport servo method for controlling a tape drive and moving a tape between a first reel driven by a first motor and a second reel driven by a second motor within the tape drive, wherein servo tracks of a servo band of the tape are read by a servo head and a writer head writes to a data band within the servo band, said method comprising:

repetitively determining a velocity of the tape, wherein said step of repetitively determining the velocity includes:
determining the velocity of the tape from a primary velocity source when the servo tracks are being read by the servo head,
determining the velocity of the tape from a secondary velocity source during at least some other times during which the servo tracks are not being read by the servo head,
repetitively comparing the velocity of the tape to a desired non-zero velocity for the tape, and
driving the velocity of the tape to the desired non-zero velocity if the velocity is not equal to the desired velocity.

2. The tape transport servo method according to claim 1, wherein the step of determining a velocity of the tape from a primary velocity source further comprises:
using at least one servo track of the tape as the primary velocity source to determine the velocity of the tape.

3. The tape transport servo method according to claim 2, wherein the step of using at least one servo track further comprises:
modulating the position and the velocity into the at least one servo track by recording a series of pulses thereon.

4. The tape transport servo method according to claim 3, wherein the step of using at least one servo track further comprises;
using a time period counter to measure spacing between transitions in the at least one servo track to produce Bcount values wherein the Bcount values vary with the velocity of the tape being read by the servo head, and
computing the velocity of the tape from a total number of the Bcount values tracked by a B-counter for a period tracked by a B-counter clock.

5. The tape transport servo method according to claim 4, wherein the computing step further comprises:
determining a transition distance which is a distance between transitions in the servo track,
determining the Bcount value calculated by the B-counter for the period tracked by the B-counter clock, and
determining the velocity of the tape by dividing the transition distance by the Bcount valued calculated for the period.

6. The tape transport servo method according to claim 1, wherein the step of determining a velocity of the tape from a secondary velocity source further comprises:
sensing and determining a reel radius of one of the reels,
determining an angular velocity for a motor for the one of the reels, and
calculating the velocity of the tape by multiplying the reel radius by the angular velocity.

7. The tape transport servo method according to claim 6, wherein the step of sensing and determining a reel radius her comprises:
using a tape transport sensor to sense the reel radius.

8. The tape transport servo method according to claim 7, wherein the step of using tape transport sensors further comprises:
using slotted optical sensors as the tape transport sensors to sense the reels if the first and second motors are brushed motors.

9. The tape transport servo method according to claim 7, wherein the step of using a tape transport sensor further comprises:
using a hall sensor as the tape transport sensor to sense an armature position of the first motor in determining the reel radius.

10. The tape transport servo method according to claim 9, further comprising:
using a pulse width modulation motor driver to receive sensed hall signals from the hall sensor to drive the first motor.

11. The tape transport servo method according to claim 10, wherein the step of determining an angular velocity further comprises:
determining an angular velocity voltage value by subtracting from a motor excitation voltage of the first motor a product of a motor current of the motor and a motor resistance of the motor, and
dividing the angular velocity voltage value by a motor back-emf constant of the first motor to obtain the angular velocity.

12. The tape transport servo method according to claim 11, wherein the motor excitation voltage is determined by using a duty-cycle of a pulse width modulation signal from the pulse width modulation motor driver to determine the motor excitation voltage to be applied to the first motor.

13. The tape transport servo method according to claim 12, wherein the motor excitation voltage is determined by:
obtaining a duty-cycle difference by subtracting a pulse width modulation on-time derived from the signal with a pulse width modulation off-time derived from the signal,
obtaining a duty-cycle sum by adding the pulse width modulation on-time with the pulse width modulation off-time and,
obtaining a duty-cycle value by dividing the duty-cycle difference with the duty-cycle sum, and
multiplying a power supply voltage of the first motor with the duty cycle value to obtain the motor excitation voltage to be applied to the first motor.

14. The tape transport servo method according to claim 11, wherein the motor current is determined by using a control law for determining a control current of the first motor.

15. The tape transport servo method according to claim 14, wherein the using a control law comprises:
determining a first current value by talking a first product between an inertia of the tape, the reel, and the first motor and an acceleration of the tape to correct a velocity error and dividing the first product by a second product between the reel radius and a motor torque constant,
determining a second current value that is equivalent to an open-loop control for a tension of the tape, determining a third current value by dividing a friction torque estimate by the motor torque constant, and determining the control current law by summing the first current value, the second current value, and the third current value.

16. The tape transport servo method according to claim 15, wherein the inertia of the tape, the reel, and the motor is determined by:

determining a first inertia value by taking a product of pi and a tape mass density and a half value of a width of the tape, determining a second inertia value by taking a difference between the reel radius raised to a fourth power and a radius of an empty reel raised to a fourth power, determining a third inertia value by an inertia of the empty reel and the first motor, and determining the inertia by taking another product of the first inertia value and the second inertia value and adding the another product with the third inertia value.

17. The tape transport servo method according to claim 1, wherein the comparing and driving steps further comprise:

using an error signal reflective between the velocity of the tape and the desired non-zero velocity for the tape to compare the velocity of the tape to the desired non-zero velocity, and driving the error signal to a zero value to drive the velocity of the tape to the desired non-zero velocity.

18. The tape transport servo method according to claim 7, further comprising:

using a counter to count a number of servo format bursts that occur for each reel revolution to determine the reel radius.

19. The tape transport servo method according to claim 7, further comprising reading a longitudinal position (LPOS) value on the servo track of the tape to determine the reel radius.

20. A tape transport servo system for controlling a tape drive and moving a tape between a first reel driven by a first motor and a second reel driven by second motor within the tape drive, wherein servo tracks of a servo band of the tape are read by a servo head and a writer head writes to a data band within the servo band, said tape transport servo system comprising:

a digital signal processor, and a servo motor control system coupled to the digital signal processor, wherein the servo motor control system repetitively determines a velocity of the tape, repetitively compares the velocity of the tape to a desired non-zero velocity for the tape, and drives the velocity of the tape to the desired non-zero velocity if the velocity is not equal to the desired non-zero velocity, and wherein said servo motor control system determines the velocity from the servo tracks when the servo tracks are being read and determines the velocity from a secondary velocity source during at least some times when the servo tracks are not being read.

21. The tape transport servo system according to claim 20, wherein the servo motor control system further comprises:

a servo logic system that communicates with the digital signal processor, a first sensor mounted proximate to the first motor for sensing an armature position of the first motor, a second sensor mounted proximate to the second motor for sensing an armature position of the second motor, a first pulse width modulation motor driver that receives sensed signals from the first sensor, a second pulse width modulation motor driver that receives sensed signals from the second sensor, a timing-based servo pattern detection system that receives a servo pattern signal of the tape from the servo head, and wherein the sensed signals are sent to the servo logic system, wherein the first and second pulse width modulation motor drivers respectively drive the first and second motors and also send pulse width modulation signals to the servo logic system and receive motor torque data from the servo logic system, and wherein the timing-based servo pattern detection system sends timing-based pattern signals of the tape to the servo logic system.

22. A tape transport servo system for controlling a tape drive and moving a tape between a first reel driven by a first motor and a second reel driven by a second motor within the tape drive, wherein servo tracks of a servo band of the tape are read by a servo head and a writer head writes to a data band within the servo band, said tape transport servo system comprising:

a digital signal processor, and a servo motor control system coupled to the digital signal processor, wherein the servo motor control system determines a position and a velocity of the tape from a primary velocity source when the servo tracks are being read by the servo head, determines the position and the velocity of the tape from a secondary velocity source when the servo tracks are not being read by the servo head, compares the velocity of the tape to a desired programmed velocity for the tape, and drives the velocity of the tape to the desired programmed velocity if the velocity is not equal to the desired velocity, wherein the servo motor control system further comprises:

a first power amplifier coupled to a first motor current, a second power amplifier coupled to a second motor current, a first digital-to-analog converter coupled to the first power amplifier, a second digital-to-analog converter coupled to the second power amplifier, a first on-time counter and a first period time counter that receives a first pulse width modulation signal from the first power amplifier, a second on-time counter and a second period time counter that receives a second pulse width modulation signal from the second power amplifier, a first velocity computation system for receiving signals from the first on-time counter and the first period time counter to compute a velocity of the first reel, a second velocity computation system for receiving signals from the second on-time counter and the second period time counter to compute a velocity of the second reel, and a control law and motor computation system that receives actual velocities from the first and second velocity computation systems and that receives reel radius information for the first and second reels and that couples to and drives the first and second motors to desired velocities.

23. A tape transport servo method for controlling a tape drive and moving a tape between a first reel driven by a first motor and a second reel driven by a second motor within a tape drive, wherein servo tracks of a servo band of the tape are read by a servo head and a writer head writes to a data band within the servo band, said method comprising:

determining a first control current for the first motor and a second control current for the second motor based on a velocity of the tape from a primary velocity source when the servo tracks are being read by the servo head, determining the first and second control currents based on the velocity of the tape from a secondary velocity source during at least some times during which the servo tracks are not being read by the servo head, comparing the first and second determined control currents to first and second desired control currents, determining a first error signal between the first determined control current and the first desired control current and a second error signal between the second determined control current and the second desired control current, driving the first and second error signals both to zero values so that the velocity of the tape is driven to a desired non-zero velocity.

24. A tape transport servo method for controlling a tape drive and moving a tape between a first reel driven by a first motor and a second reel driven by a second motor within a tape drive, wherein servo tracks of a servo band of the tape are read by a servo head and a writer head writes to a data band within the servo band, said method comprising:

determining a first control current for the first motor and a second control current for the second motor based on a velocity of the tape from a primary velocity source when the servo tracks are being read by the servo head, determining the first and second control currents based on the velocity of the tape from a secondary velocity source when the servo tracks are not being read by the servo head, comparing the determined first and second control currents to desired first and second control currents, determining a first error signal between the first determined control current and the first desired control current and a second error signal between the second determined control current and the second desired control current, driving the first and second error signals both to zero values so that the velocity of the tape is driven to a desired velocity, wherein the driving step further comprises:

using a first pulse width modulator to convert the first error signal into a first pulse wave form, using a second pulse width modulator to convert the second error signal into a second pulse wave form, and using the first pulse wave form to switchingly drive the first motor to a positive sense voltage if the first pulse wave form is on and to a negative sense voltage if the first pulse wave form is off, wherein switchingly diving the first motor determines a velocity of the first motor, and using the second pulse wave form to switchingly drive the second motor to a positive sense voltage if the second pulse wave form is on and to a negative sense voltage if the second pulse wave form is off, wherein switchingly driving the second motor determines a velocity of the second motor.

\* \* \* \* \*